United States Patent [19]

Barnum et al.

[11] Patent Number: 4,538,307
[45] Date of Patent: Sep. 3, 1985

[54] FLOOD LEVEL SENSOR FOR FLUID FILLING SYSTEMS

[75] Inventors: Thomas G. Barnum, Fox Point; William A. Smart, Jr., Germantown; Donald H. Mullett, Hartland, all of Wis.

[73] Assignee: Bradley Corporation, Menomonee Falls, Wis.

[21] Appl. No.: 637,297

[22] Filed: Aug. 3, 1984

[51] Int. Cl.³ ............... E03D 11/18; E03D 11/02
[52] U.S. Cl. ............................. 4/427; 4/415;
4/DIG. 15; 4/661; 137/389; 137/392;
137/624.27; 137/624.12
[58] Field of Search ............ 4/205, 415, 427, 661,
4/DIG. 15, 302, 249, 301, 304, 305, 306, 308,
312; 137/389, 251, 392, 253, 624.12, 429,
624.27, 606; 251/131, 134

[56] References Cited

U.S. PATENT DOCUMENTS

| | | | |
|---|---|---|---|
| 1,815,384 | 7/1931 | Tracy | 4/427 |
| 1,956,086 | 4/1934 | Tracy | 4/427 |
| 1,956,087 | 4/1934 | Tracy | 4/400 |
| 2,080,073 | 5/1937 | Finley | 4/370 |
| 4,195,374 | 4/1980 | Morris et al. | 4/427 |
| 4,203,173 | 5/1980 | Morris et al. | 4/427 |
| 4,402,093 | 9/1983 | Luker et al. | 4/427 |
| 4,498,203 | 2/1985 | Barnum et al. | 4/427 |

*Primary Examiner*—Henry K. Artis
*Attorney, Agent, or Firm*—Quarles & Brady

[57] ABSTRACT

An improved flood level sensor has an upstanding, vented tube extending above and outside a receptacle while maintaining fluid communication with an enclosed rim of the receptacle. A partial vacuum is communicated to an orifice which is located within the tube at a height related to a limit on the level of fluid in the receptacle. The level of fluid in the tube depends upon the fluid pressure in the enclosed rim and therefore upon the fluid level in the receptacle. When the fluid level in the receptacle is below flood level, the orifice is able to relieve any partial vacuum communicated to it. However, when the level of fluid in the receptacle rises to the flood level, the fluid level in the tube rises to partially seal the orifice and prevent relief of the partial vacuum which then actuates a valve lockout device.

14 Claims, 8 Drawing Figures

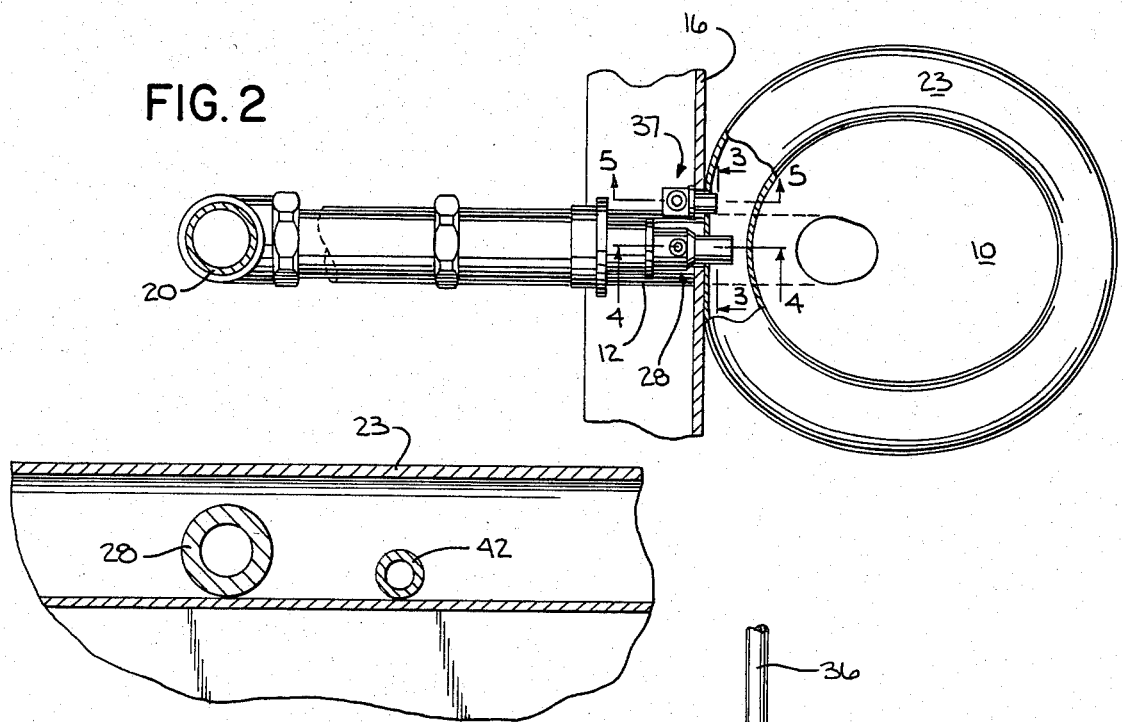
FIG. 2
FIG. 3
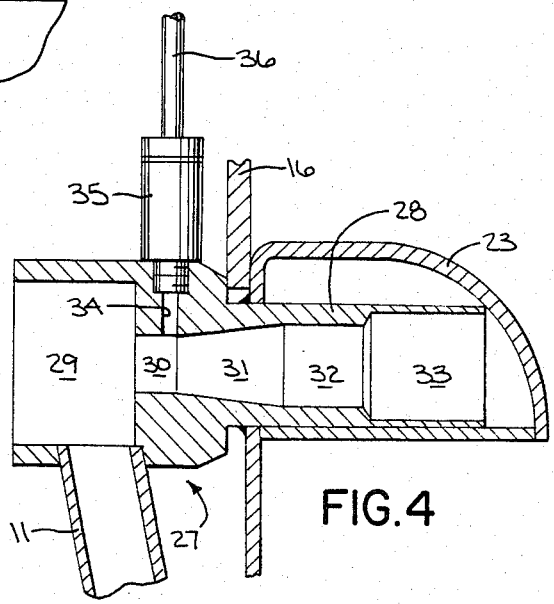
FIG. 4
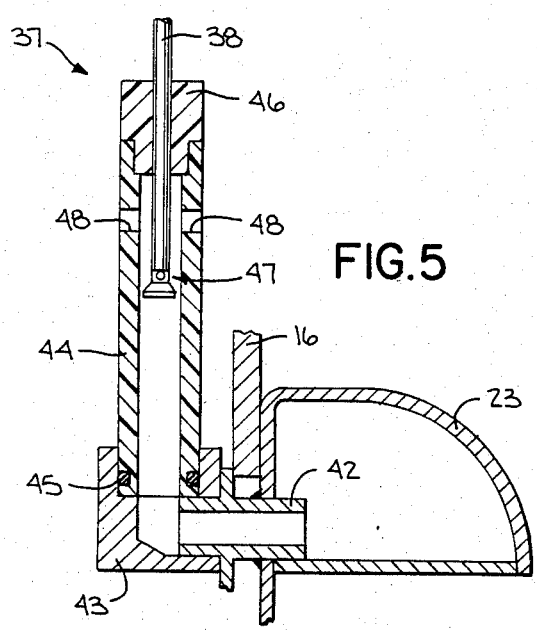
FIG. 5
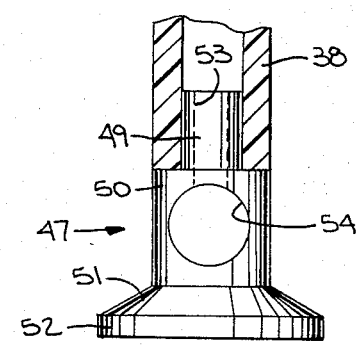
FIG. 6

FLOOD LEVEL SENSOR FOR FLUID FILLING SYSTEMS

BACKGROUND OF THE INVENTION

I. Field of the Invention

The invention relates generally to an improvement to a mechanism for preventing flooding or overflows in holding tanks and receptacles. It more particularly relates to an improved flood level sensor for sensing overflows in toilets of the type used in correctional institutions, however, the invention is capable of significantly wider application.

II. Description of the Prior Art

In recent years, greater attention has been paid to the expansion and renovation of prisons and other correctional facilities. It has been the experience in such facilities that inmates will sometimes attempt to disrupt normal operations by stuffing clothes or other objects into a toilet bowl and repeatedly flushing the toilet to cause its flooding. This can result in substantial property damage, and if the living units in which the toilets are located are on an upper floor, the overflow may find its way to offices, archives or other installations below. Toilets in such facilities must be tamper-resistant in order to prevent these occurrences.

Various devices have been proposed to prevent either accidental or deliberate flooding of toilets. For example, U.S. Pat. Nos. 1,815,384; 1,956,086; and 1,956,087 all granted to M. J. Tracy, show the use of floats for level sensing in several systems for mechanically disabling toilet flush mechanisms. In each of these patents, the float is located in an auxiliary compartment in which the fluid level rises with the fluid level in the toilet bowl. Similarly, Finley, U.S. Pat. No. 2,080,073 also shows a mechanical float in an auxiliary compartment. As the float rises, the level of mercury in a third compartment is lowered, to break a vacuum created by a toilet siphon and interupt the flow from a reservoir tank to a toilet bowl. Luker et al, U.S. Pat. No. 4,402,093 shows a movable valve element that is manually positioned between a toilet reservoir tank and a toilet bowl, if it appears that the toilet bowl is ready to overflow, to interrupt flow from the tank to the bowl.

A copending U.S. patent application of Barnum et al, Ser. No. 608,392, filed May 9, 1984, and entitled "Flood Preventer for Fluid Filling Systems", discloses a lockout mechanism that is inserted between a toilet flush valve and a valve actuator button to prevent repeated flush cycles when flooding of the toilet is sensed. A partial vacuum is generated during each flush cycle, and unless relieved through an orifice, the partial vacuum will operate the lockout mechanism. By positioning the orifice at a selected level in the toilet bowl, the flush valve can be "locked out" when the water reaches that level and partially seals the orifice—thereby preventing relief of the vacuum.

In this prior system, the level sensing orifice was accessible to occupants of the facilities in which it was installed. When the orifice was located within the toilet rim, there was a problem of excessive water being drawn into the vacuum lines due to the strong vacuum generated during flush cycles. It was in this environment that the present invention was made.

SUMMARY OF THE INVENTION

The invention relates to an improved level sensor which is located outside the tank in which fluid level is controlled and which prevents excessive fluid from being drawn into the vacuum lines communicating with a flush cycle lockout mechanism.

The level sensor includes an upstanding tube that extends outside and above the receptacle. Means at the lower end of the tube provide communication between the tube and an enclosed rim of the receptacle. An orifice is located within the tube at a height related to a limit on the level of fluid in the receptacle. The upstanding tube forms a vent that communicates with the orifice and maintains atmospheric pressure in a gap between the orifice and fluid entering the tube from the receptacle. This isolates the fluid from the effects of a partial vacuum being drawn through the orifice, and reduces the amount of fluid entering the line.

One embodiment of the invention has a friction plug at the upper end of the tube to hold the lower end of a vacuum line within the tube. The lower end of the vacuum line forms the orifice and the vacuum line is manually slidable relative to the plug to locate the orifice at the desired height.

A second embodiment has a cap screw in the upper end of the tube. A tubular adjusting screw extends through and is threadedly engaged in the cap screw. The upper end of the adjusting screw is in communication with a vacuum line and the lower end forms an orifice within the tube. The adjusting screw can be turned relative to the cap screw to locate the orifice at the desired height.

A further aspect of the invention relates to an orifice member having a shield portion for protecting the system from drops of fluid that might occasionally splash up and prematurely actuate the lockout mechanism.

Another aspect of the invention relates to the positioning of the level sensor and the vacuum generator so as to minimize wall effects created by fluid flow within the enclosed rim.

One object of the invention is to provide a flood level sensor in which excessive fluid will not enter the vacuum lines of the system.

Another object of the invention is to provide a flood level sensor in which a level sensing orifice is less accessible to occupants in a living unit in which the invention is installed.

Another object of the invention is to provide a flood level sensor which will not be inadvertently triggered by isolated drops of fluid that may enter the sensor.

Another object of the invention is to provide a flood level sensor which can sense the level of water in the receptacle from within an enclosed rim.

These and other objects and advantages of the invention will appear from the following description. In the description, reference is made to the accompanying drawings which form a part hereof and in which there is shown, by way of illustration, a preferred embodiment. Such embodiment does not necessarily represent the full scope of the invention, however, and reference is made to the claims for determining that scope.

BRIEF DESCRIPTION OF THE DRAWINGS

FIG. 2 is a sectional view of the plumbing system taken in the plane indicated by line 2—2 in FIG. 1;

FIG. 3 is an enlarged sectional view of the improved level sensor taken in the plane indicated by line 3—3 in FIG. 2;

FIG. 4 is an enlarged sectional view of a portion of the plumbing system taken in the plane indicated by line 4—4 in FIG. 2;

FIG. 5 is an enlarged sectional view of a portion of the plumbing system taken in the plane indicated by line 5—5 in FIG. 2; and FIG. 6 is a detail view of the orifice shield member 10 incorporated in FIG. 5.

DETAILED DESCRIPTION OF THE PREFERRED EMBODIMENTS

Figure 1:
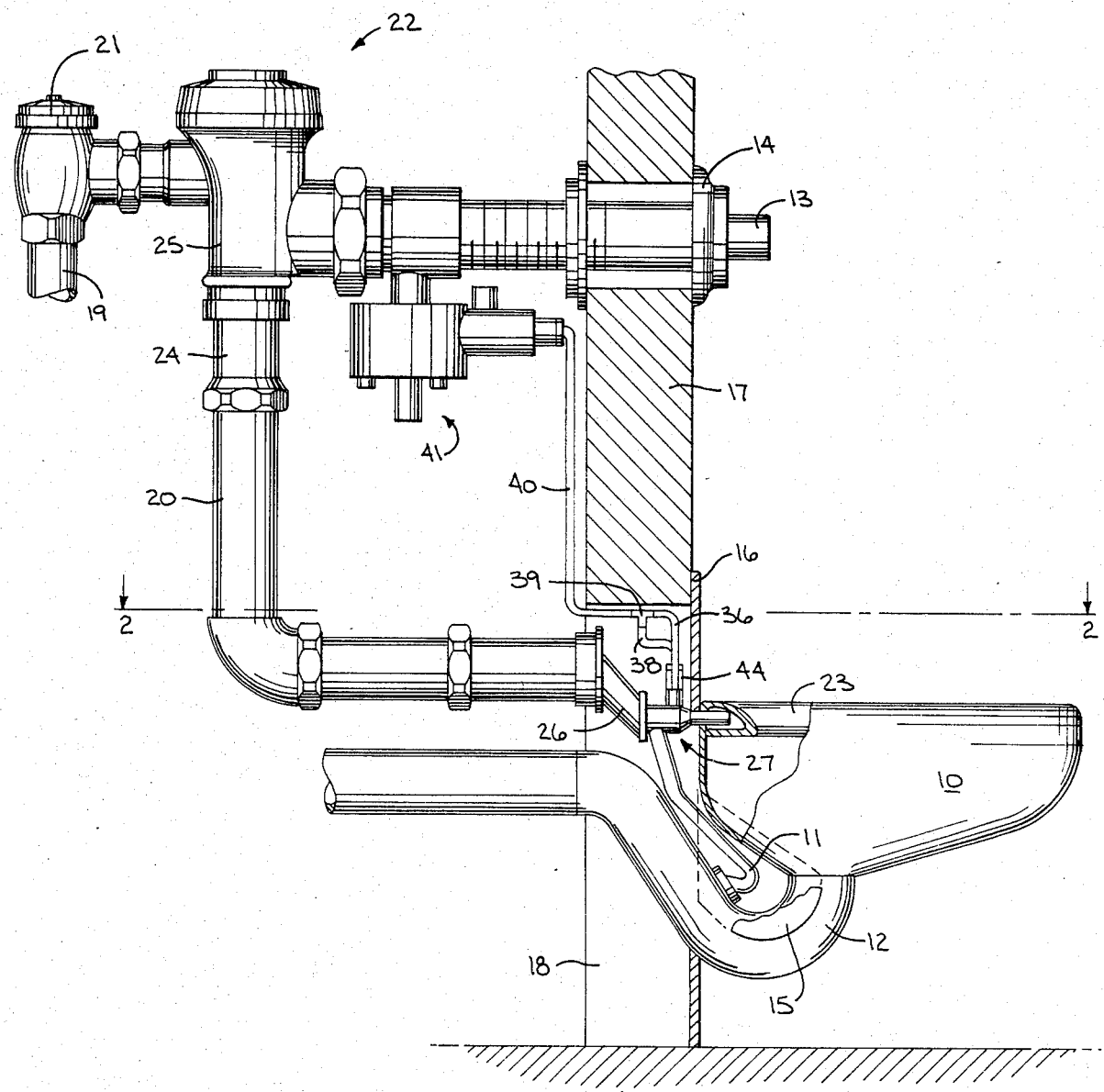
FIG. 1 is a side view in elevation of a plumbing system that incorporates the improved level sensor of the present invention.

Referring to FIG. 1, the invention is shown as it relates to a toilet and plumbing of the type used in correctional facilities. The only portions of the installation that extend into a living unit of the facility are the toilet bowl 10, a blowout pipe 11, a drain pipe 12, a flush actuator button 13, and an escutcheon plate 14. The toilet bowl 10 and pipes 11 and 12 are made of stainless steel for durability. The blowout pipe 11 and the area between the bottom of the bowl 10 and the drain pipe 12 are enclosed on opposite sides by stainless steel cover plates 15, one of which is seen broken away in FIG. 1. The toilet bowl 10 is mounted to a stainless steel back plate 16 which in turn is fastened to a wall 17 of the facility by nuts (not shown), which are welded on the back of the plate 16 to receive bolts (not shown). The back plate 16 secures both the toilet plumbing and a wall opening 18 from access by persons in the living unit and this limitation is desirable in correctional facilities.

The toilet bowl 10 is filled from a water supply line 19 represented by a water inlet pipe at the upper left of FIG. 1. During the flush cycle, water is admitted to a fill line portion 20 of the water supply line 19 through an isolation valve 21 and a flush/fill control valve 22. The flush/fill control valve 22 is of the type which opens for a predetermined time interval upon manual actuation and then closes automatically. This type of valve 22 must be allowed to reset before being actuated a second time to initiate a second flush cycle. The flush/fill control valve 22 and its timed interval of valve opening are matched with the system water pressure to provide a sufficient volume of water for forcing the contents of the toilet bowl 10 through the drain pipe 12. This volume of water flows into the toilet bowl at a location or locations around the enclosed rim 23 and also flows into the drain pipe 12 through the blowout pipe 11. When the flush/fill valve 22 closes, the remaining water fills the bottom portion of the toilet bowl 10 to form a water trap seal.

The flush/fill control valve 22 is a commercially available, off-the-shelf item. It is supplied with an associated actuator assembly and is available under the trade designation Royal 601 Valve from the Sloan Valve Company of Franklin Park, Ill. A vacuum breaker 24, also available from the Sloan Valve Company under the trade designation V-500-A, is connected to the lower end of the valve housing 25. Extending downwardly from the vacuum breaker 24 is a vertical section of the fill line piping 20. The upper end of this section is connected with the aid of a union, while the lower end of the section is connected with an elbow and two more unions to two horizontal sections of the fill line piping 19. These horizontal sections lead to the wall opening 18, where a downwardly slanting connecting section 26 leads to a Y-fitting 27.

Still referring to FIG. 1, the Y-fitting 27 is made of stainless steel and is supported at one end by the connecting pipe 26 and at the other end by the toilet bowl 10. As seen in more detail in FIG. 4, the horizontal portion of the Y-fitting 27 forms a venturi nozzle 28 with a cylindrical inlet chamber 29 that leads to a constricted passage 30, and then through a widening transition passage 31, to a venturi outlet 32. The venturi outlet 32 leads to a diffuser passage 33 of relatively greater diameter that extends the projection of venturi nozzle 28 into the enclosed rim 23. The diffuser passage 33 acts to reduce the water stream velocity and the turbulence of flow entering the interior of the rim 23. A low pressure port 34 is formed in the nozzle 28 to communicate with the constricted passage 30. A fitting 35 connects a first vacuum line 36 to the low pressure port 34. A portion of the water entering the Y-fitting 27 bypasses the constricted passage 30 and low pressure port 34 through the blowout pipe 11, which enters the inlet chamber 29 from the bottom. The remaining portion of the water, however, is conveyed through the constricted passage 30, the transition passage 31, the outlet 32 and the diffuser passage 33 into the enclosed rim of the toilet bowl. This flow creates a pressure drop in the constricted passage 30 which draws a partial vacuum through the vacuum line 36.

The venturi nozzle 28 is a preferred type of vacuum generating source. It is, however, well known that other flow devices such as ejectors or eductors also perform a vacuum generating function, and these could be used to carry out the invention in other embodiments.

Next to the venturi nozzle 28 in FIG. 2 is a level sensor 37, which also is mounted to the toilet bowl 10 and projects into the interior of the rim 23 as seen in FIGS. 2 and 5. The level sensor 37 is connected to a second vacuum line 38 seen in FIG. 1.

As further illustrated in FIG. 1, the vacuum line 38 is connected to the first vacuum line 36 by a three-way T-shaped connector 39. This connector 39 also connects vacuum line 36 and vacuum line 38 to a third vacuum line 40 which travels upwardly to connect to a pneumatically responsive lockout device 41.

A partial vacuum is generated in vacuum line 36 when water flows through the venturi nozzle 28. This partial vacuum will also be drawn through line 40 to operate the lockout device 41 unless the partial vacuum is relieved or satisfied through vacuum line 38. When actuated, the lockout device 41 will prevent further operation of the fill/flush valve 22 using the actuator button 13. Several embodiments of suitable lockout devices 41 and their operation are disclosed in U.S. patent application, Ser. No. 498,149, more fully cited above, and such disclosure is hereby incorporated by reference.

The flood prevention system operates on the principle that water has a higher density and a higher viscosity (resistance to flow) than air. The level sensor 37 allows enough air to be drawn through line 38 to satisfy any partial vacuum in line 36 that would otherwise be drawn through line 40. The level sensor 37 does not, however, allow enough volume of the higher viscosity, higher density medium, water, to be drawn through lines 38 and 36 so as to satisfy the vacuum generating capability of the venturi nozzle 28.

When water stands in the toilet bowl 10 between flushing cycles to form a water trap seal, it reaches a level that shall be referred to as the normal level. Any level above this shall be considered an excess level. Previously, a level sensor has been located at some preselected excess level or flood level which is greater than the lowest excess level, but the level sensor has also been placed in the bowl 10, below the rim 23, where it has been visible and accessible.

The level sensor 37 of the present invention has been made inconspicuous and inaccessible by removing it to the interior of the rim 23 as seen in FIGS. 2, 3 and 5. The only portion of the level sensor 37 projecting into the interior of the rim 23 is a cylindrical pickup adapter 42 of stainless steel that is welded to the toilet bowl 10 for a watertight seal. The adapter 42 projects at least one-quarter inch into the interior of the rim 23 as seen in FIG. 5 and is spaced laterally a minimum of 1.5 inches from the venturi nozzle 28 as seen in FIG. 3. The positioning of the adapter 42 is important to avoid localized pressure from the venturi nozzle 28 and the effects of flow along the interior walls of the rim 23. When the water level in the bowl reaches the lower level of the seat rim 23, the increased pressure within the rim 23 during the flush cycle tends to force water into the sensor 37 through the adapter 42, so that it rises higher and faster than the level of water in the bowl 10.

Referring to FIG. 5, a stainless steel elbow 43 is fitted over the rear end of the pickup adapter 42 and has a upwardly directed bore that receives the lower end of a transparent tube 44. The change in flow direction in the elbow acts as a surge suppressor. Other means of suppression such as baffles and screens are anticipated in some embodiments. The tube 44 is made of an acrylic or polycarbon thermoplastic material. The tube has a circular groove around its lower end and an O-ring 45 is situated in the groove and trapped between the tube 44 and the elbow 43 to provide a watertight seal. The elbow 43 and the adapter 42 provide fluid communication between the lower end of the tube 44 and the interior of the rim 23. A friction plug 46, formed of a plastic offered under the trade designation of Celcon, is press fitted into the upper end portion of the tube 44. The second vacuum line 38 slides with some resistance through a passage in the plug 46 and terminates in a lower end that is suspended inside the tube 44. The line 38 can be manually adjusted to raise or lower its lower end for reasons to become more apparent from the explanation below. The lower end of the vacuum line 38 forms an orifice in which an orifice shield member 47 is received. As seen in FIG. 5, the lower end of the vacuum line 38 and the orifice shield member 47 are positioned in the tube outside and above the rim 23. The orifice is therefore less accessible than if it were to enter the rim 23 directly. This positioning also provides a gap between the orifice and the opening of the adapter 42 into the rim 23 which is important for the operation of the level sensor.

It should also be observed in FIG. 5 that the tube 44 has vent holes 48 located above the lower end of the vacuum line 38, but below the friction plug 46. These vent holes 48 provide passage for air at atmospheric pressure into the tube and into the gap between the lower end of vacuum line 38 and a rising level of water entering the level sensor 37 through the adapter 42.

The vacuum pressure drawn through line 38 is such that more water than desired might be drawn into the line 38 if the orifice were located in the position of the pickup adapter 42 or within the rim itself. Not only would there be pressure within the rim 23 tending to force water into the line 38, but there would also be a substantial vacuum pressure acting on the water, even though the water is of higher viscosity than air. The vent holes 48 eliminate this influence by providing air at atmospheric pressure in the gap between the orifice and the rising level of water. Pressure within the rim 23 will still cause the water to rise higher in the tube 44 than in the bowl 10 during flooding, but by adjusting the height of the lower end of the vacuum line 38, a suitable operating position can be located. The orifice will become partially sealed when water in the bowl reaches a flood level near the top of the rim 23. The ability to adjust the height of the orifice allows adjustment of the level sensor 37 in response to different amounts of water pressure in the rim, as well as an ability to adjust the flood level at which the lockout device 41 in FIG. 1 is operated.

An orifice shield member 47 is inserted into the lower end of the vacuum line 38 as seen in FIGS. 5 and 6. This member is made of a plastic such as that offered under the trade designation of Celcon and has an insert portion 49, a cylindrical body portion 50, a frusto-conical portion 51 and a downwardly facing shield portion 52. The diameter of the insert portion 49 is slightly larger than the orifice formed by the lower end of the vacuum line 38 to provide an air-tight seal. The shield member 52 has a passageway from the interior of line 38 to the exterior that is provided by an axial hole 53 extending through the insert portion 49 and into the body portion 50 where it intersects a radial through-hole 54. As seen in FIG. 6, the frusto-conical portion 51 and the shield portion 52 are located below the radial through-hole 54 and extend radially outward thereof to protect the passageway from drops of water that might splash up and block the orifice to cause premature operation of the lockout device 41 before the flood level has been reached.

Figure 7:
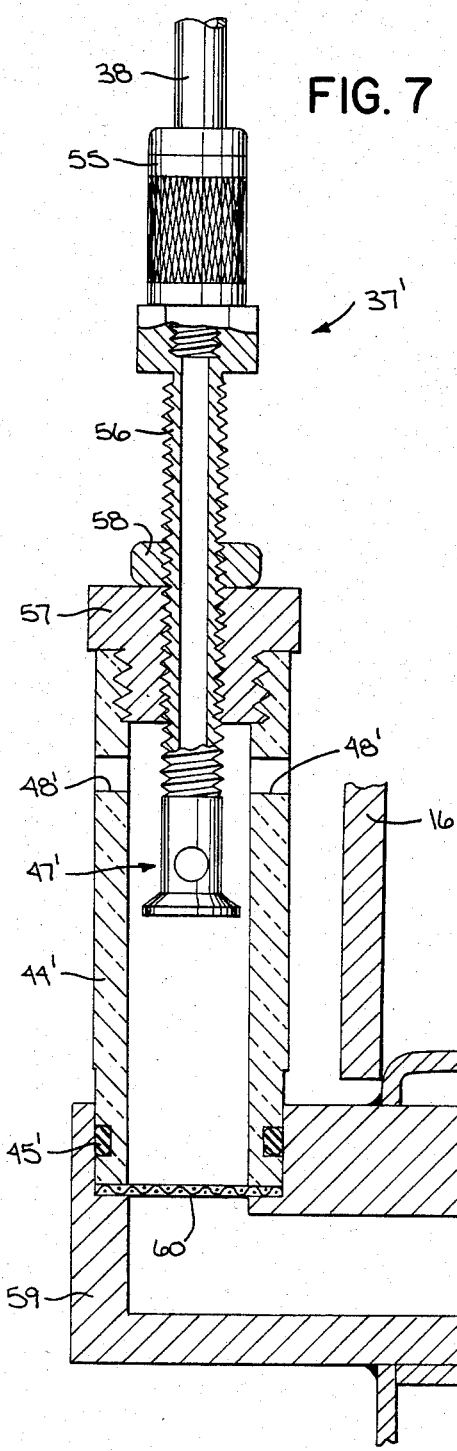
FIG. 7 is an enlarged view corresponding to FIG. 5 of a second embodiment of the invention.
Figure 8:
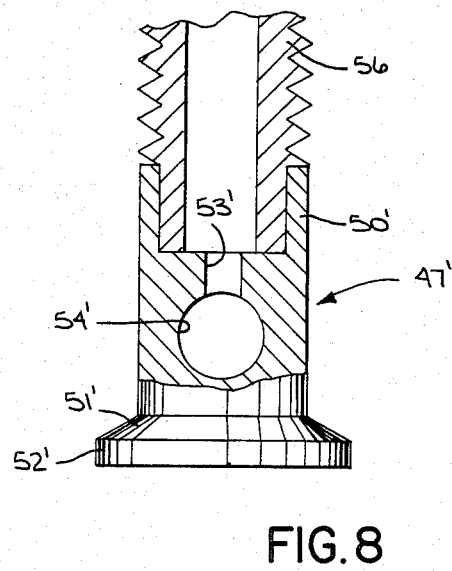
FIG. 8 is a detail view of the orifice shield member incorporated in FIG. 7.

A second embodiment of a level sensor of the present invention is shown in FIG. 7 and is generally referred to as 37'. In level sensor 37', the vacuum line 38 is coupled by a connector 55 to be in communication with a tubular adjusting screw 56 which is made of brass. The adjusting screw 56 is in threaded engagement with a brass cap screw 57 which is screwed into the upper end of a transparent tube 44'. The adjusting screw 56 extends through the cap screw 57 into the tube 44' to an unthreaded lower end which forms an orifice and is best shown in FIG. 8. The partial vacuum is therefore communicated from the vacuum line 38 to the orifice by the adjusting screw 56. The height of the orifice within the tube 44' is adjustable by turning the adjusting screw 56 relative to the cap screw 57 to locate the orifice at a height related to the flood level in the receptacle. A lock nut 58 is provided to secure the adjusting screw 56 at the desired height.

The tube 44' has vent holes 48' above the lower end of the adjusting screw 56 but below the cap screw 57. As in the first embodiment, the vent holes 48' provide atmospheric pressure in the gap between the lower end of the adjusting screw 56 and a rising level of water entering the lower end of the tube 44' to isolate the water from the effects of the partial vacuum drawn through the orifice.

The lower end of the tube 44' is mounted in the upwardly directed bore of a stainless steel elbow 59. An O-ring 45' in a groove around the end of the tube 44' provides a watertight seal between the tube 44' and the elbow 59. A screen 60 made of a stainless steel wire cloth is trapped between the end of the tube 44' and the elbow 59 to filter and to calm the water entering the tube 44'. The upwardly directed bore of the elbow 59 intersects a horizontal bore which opens into the enclosed rim 23 so that elbow 59 provides communication between the tube 44' and the interior of the rim 23. The elbow 59 is welded to the toilet bowl 10 for a watertight seal and projects at least one quarter inch into the rim 23 as seen in FIG. 7. The elbow 59 is also laterally spaced a minimum of 1.5 inches from the venturi nozzle 28. As in the first embodiment, this positioning helps avoid localized pressure from the venturi nozzle 28 and the effects of flow along the interior walls of the rim 23.

As best shown in FIG. 8, an orifice shield member 47', which is almost identical to the orifice shield member 47, is mounted on the lower end of the adjusting screw 56. The only difference between the two members 47 and 47' is that the member 47' does not have an insert portion but has a cylindrical body portion 50' with an axial bore which is sized for a press fit onto the lower end of the adjusting screw 56 to provide an airtight seal. A passageway from the interior of the adjusting screw 56 to the exterior is provided by an axial hole 53' which intersects a radial through-hole 54'. As in member 47, a frusto-conical portion 51' and a shield portion 52' are positioned below and extend radially outward of the radial hole 54' to guard against premature blockage of the orifice by random splashes within the tube 44'.

From this description it should be apparent how the flood level sensor has been improved by relocating the orifice from inside the bowl to outside, and in some cases above the flood level at which operation of the lockout device is desired. The invention has also provided an adjustment feature for the orifice and has lessened the tendency of water to enter the vacuum line from the sensor. Still further, the invention has provided a member protecting the orifice from isolated drops of water that might cause premature operation of the flood preventer mechanism.

It will be apparent to those skilled in the art that certain changes and modifications might be made without departing from the spirit and scope of the present invention. It should therefore be understood that the present invention is not to be limited by details of the description of a preferred embodiment, but is to be interpreted in view of the claims which follow.

We claim:

1. In a flood preventer mechanism having an orifice to which a partial vacuum is communicated for controlling the level of fluid in a receptacle with an enclosed rim, the improvement comprising:
   an upstanding tube which is disposed outside and extends above the enclosed rim;
   means for providing fluid communication between the upstanding tube and the enclosed rim;
   means for locating the orifice within the tube at a height related to a limit on the level of fluid in the receptacle; and
   wherein the upstanding tube forms a vent to the atmosphere above the orifice, the vent being in communication with the orifice inside the tube to maintain atmospheric pressure in a gap between the orifice and fluid entering the tube from the receptacle.

2. The improvement of claim 1, wherein the orifice locating means includes a tubular adjusting screw which is threadedly engaged in the upper end of the tube and has a lower end that forms the orifice so that the partial vacuum is communicated through the adjusting screw to the orifice.

3. The improvement of claim 2, further comprising an orifice shield member mounted on the lower end of the adjusting screw and having a passageway from the interior of the adjusting screw to the interior of the tube and having a shield below the passageway for protecting the orifice from upwardly splashing drops of fluid that might block the orifice and cause premature actuation of the flood preventer mechanism.

4. The improvement of claim 1, wherein the orifice locating means includes a friction plug in the upper end of the tube and a vacuum line which extends through and is frictionally engaged by the plug and which forms the orifice at its lower end so that the partial vacuum is communicated through the vacuum line to the orifice.

5. The improvement of claim 1, wherein the means for providing fluid communication between the upstanding tube and the enclosed rim includes an elbow which is coupled to the lower end of the tube and projects at least one-quarter inch into the enclosed rim of the receptacle to reduce the tendency of flow within the rim to cause premature entry of water into the tube.

6. The improvement of claim 5, wherein the flood preventer mechanism includes a vacuum generating nozzle that enters the enclosed rim of the receptacle, and wherein the elbow is spaced laterally a minimum of 1.5 inches from the vacuum generating nozzle to reduce the effects of localized pressure generated by flow from the nozzle.

7. In a flood preventer mechanism for controlling the level of fluid in a receptacle with an enclosed rim, the flood preventer mechanism including a vacuum line through which a partial vacuum is relieved to prevent actuation of a valve lockout device, an improvement comprising:
   an upstanding tube extending outside and above the receptacle, the tube having an upper end and the tube having a lower end that communicates with the enclosed rim of the receptacle;
   means at the upper end of the tube for locating a lower end of the vacuum line within the tube at a height related to a limit on the level of fluid in the receptacle;
   wherein an orifice is formed at the lower end of the vacuum line; and
   wherein the upstanding tube forms a vent to the atmosphere above the orifice, the vent being in communication with the orifice outside the vacuum line and inside the tube to maintain atmospheric pressure in a gap between the orifice and fluid entering the tube from the receptacle.

8. The improvement of claim 7, further comprising an orifice shield member mounted on the lower end of the vacuum line and having a passageway from the vacuum line to the interior of the tube and having a shield below the passageway for protecting the orifice from upwardly splashing drops of fluid that might block the orifice and cause premature actuation of the flood preventer mechanism.

9. The improvement of claim 7, further comprising adapter means coupled to the lower end of the tube and projecting at least one-quarter inch into the enclosed rim of the receptacle to reduce the tendency of flow within the rim to cause premature entry of water into the tube.

10. The improvement of claim 7, wherein the means at the upper end of the tube allows slidable adjustment of the height of the lower end of the vacuum line to adjust the response of the flood preventer mechanism to pressure within the rim.

11. In a flood preventer mechanism for controlling the level of fluid in a receptacle having an enclosed rim, wherein the flood preventer mechanism includes a vacuum line to permit or inhibit relief of a partial vacuum drawn therethrough, an improvement comprising:
- an upstanding tube positioned outside the receptacle and coupled for fluid communication with the enclosed rim of the receptacle;
- means in the upper portion of the tube for locating a lower end of the vacuum line within the tube above the normal level of fluid in the receptacle and at a height related to a limit on the level of fluid in the receptacle;
- an orifice at the lower end of the vacuum line; and wherein the tube is vented to the atmosphere above the orifice to maintain atmospheric pressure on fluid entering the tube as the partial vacuum is drawn through the vacuum line.

12. The level sensor of claim 11, further comprising an orifice shield member mounted on the lower end of the vacuum line and having a passageway from the vacuum line to the interior of the tube and with a shield below the passageway for protecting the orifice from upwardly splashing drops of fluid that might block the orifice and cause premature actuation of the flood preventer mechanism.

13. The improvement of claim 11, further comprising adapter means coupled to the lower end of the tube and projecting at least one-quarter inch into the enclosed rim of the receptacle to reduce the tendency of flow within the rim to cause premature entry of water into the tube.

14. The improvement of claim 11, wherein the means in the upper portion of the tube allows slidable adjustment of the height of the lower end of the vacuum line to adjust the response of the flood preventer mechanism to pressure within the rim.

* * * * *